US007023242B2

(12) United States Patent
Brand et al.

(10) Patent No.: US 7,023,242 B2
(45) Date of Patent: Apr. 4, 2006

(54) METHOD AND CIRCUIT CONFIGURATION FOR ADAPTING THE VOLTAGE LEVEL FOR THE TRANSMISSION OF DATA

(75) Inventors: Uwe Brand, München (DE); Wilhelm König, Stadtbergen (DE)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 10/490,578

(22) PCT Filed: Sep. 20, 2002

(86) PCT No.: PCT/DE02/03585

§ 371 (c)(1), (2), (4) Date: Mar. 19, 2004

(87) PCT Pub. No.: WO03/028324

PCT Pub. Date: Apr. 3, 2003

(65) Prior Publication Data

US 2004/0264230 A1 Dec. 30, 2004

(30) Foreign Application Priority Data

Sep. 21, 2001 (DE) ................................ 101 46 585

(51) Int. Cl.
*H03K 19/0175* (2006.01)

(52) U.S. Cl. ............................ 326/82; 326/31; 326/86

(58) Field of Classification Search .................. 326/82, 326/31

See application file for complete search history.

(56) References Cited

U.S. PATENT DOCUMENTS

| | | | | |
|---|---|---|---|---|
| 5,604,450 | A * | 2/1997 | Borkar et al. | 326/82 |
| 5,939,923 | A | 8/1999 | Kawamura | |
| 5,973,521 | A | 10/1999 | Kim | |
| 6,069,494 | A | 5/2000 | Ishikawa | |
| 6,281,715 | B1 | 8/2001 | DeClue et al. | |

* cited by examiner

*Primary Examiner*—Daniel Chang

(57) ABSTRACT

The invention relates to a method and to a circuit configuration for adjusting the voltage level for the electrical data transmission between a transmitting component and a receiving component of one or different assemblies. According to the invention, the voltage level is increased step-wise or continuously until the required value for the correct representation of the signals to be transmitted is reached in the receiving component. Increase of the voltage level is stopped by the transmission of respective information. The inventive method and circuit are advantageous in that the minimum voltage level required for the transmission of data can be precisely adjusted. Power loss can be thereby reduced and adjacent channel interferences through high voltage levels can be reduced to a minimum.

19 Claims, 5 Drawing Sheets

METHOD AND CIRCUIT CONFIGURATION FOR ADAPTING THE VOLTAGE LEVEL FOR THE TRANSMISSION OF DATA

CROSS REFERENCE TO RELATED APPLICATIONS

This application is the US National Stage of International Application No. PCT/DE02/03585, filed Sep. 20, 2002 and claims the benefit thereof. The International Application claims the benefits of German application No. 10146585.8 DE filed Sep. 21, 2001, both of the applications are incorporated by reference herein in their entirety.

1. Field of Invention

The invention relates to a method and a circuit arrangement for setting the voltage level during the electrical transmission of data between a sending component and a receiving component of one or different modules.

2. Background of Invention

Efficiency in the electrical transmission of data between electronic components plays a major role particularly in those areas in which, as in communication technology, data is transferred at high frequencies. Optimizing the values of the voltages and currents which arise is an important factor here in order to minimize power dissipation.

Certain interface standards have emerged to support the fast electrical transmission of data between components on a module or via a backplane to a different module. Such standards include, for example, Emitter Coupled Logic (ECL), Gunning Transceiver Logic (GTL), Current Mode Logic (CML) and Low Voltage Differential Signaling (LVDS). In these standards, the voltage levels and/or output currents, terminating resistors, etc. are standardized. Here, the output circuits of the send unit of the components often operate as switched current sources. When the current source is switched on, a voltage drop is produced at the terminating resistor of the receiver, which voltage drop corresponds for example to a logic one. Typical values for the voltage drop or voltage difference used to define the two states for a binary logic are several hundred mV. Owing to the tolerances of the integrated current sources which arise due to manufacturing tolerances, variations in supply voltages and temperature influences and due to manufacturing tolerances, temperature coefficients and possible nonlinearities of integrated terminating resistors, the voltage level generated by the voltage drop at the terminating resistors also exhibits considerable tolerances. Typical maximum fluctuations for integrated current sources and terminating resistors lie in the area of 20% for CMOS technology.

To ensure reliable data transmission, the output level must be chosen such that even in the worst case, i.e. with values of output current and terminating resistor which lie at the lower end of the respective fluctuation range, a voltage level is still generated at the receiver component which can be clearly and unequivocally detected at the receiver component. This choice of the output level can lead to a considerably higher output current being generated than is necessary for the data transmission; said output current differs all the more from the minimum necessary value for the voltage the greater the maximum values for output current and terminating resistor differ from the values at the lower end of the fluctuation ranges.

The higher output current leads to a higher power dissipation and, at a given data rate, to a higher edge steepness of the signals and consequently to increased interferences for adjacent channels.

A reduction in the tolerances is possible through the fabrication of accurate reference resistors and/or voltage sources by means of special process steps during manufacture or by laser trimming immediately after the fabrication process. This solution for reducing tolerances and hence for an improved setting of the voltage level is time-consuming, labor-intensive and expensive and therefore is generally used only in special cases.

In order to adapt the output current and reduce the level fluctuations, accurate external reference elements are sometimes used, e.g. resistors and/or voltage sources. This approach is attended by the disadvantage of additional space requirements on the module and additional costs. Additional pins are also required on the component. Integrated terminating resistors are also often adjusted to a precise reference resistance by means of regulating circuits. An external element is also necessary for this, however. Moreover, the above measures permit only a reduction in the tolerances and cannot prevent significant fluctuations in voltage levels and power dissipation.

SUMMARY OF INVENTION

The object of the invention is to specify a method and a circuit arrangement for setting the voltage level, whereby the disadvantages of the known methods for reducing the fluctuation range are avoided.

The object is achieved by a method and a circuit arrangement according to claims 1 and 16 respectively by their characterizing parts.

With the method according to the invention, the voltage level at the output of the sending component is incrementally or continuously increased. At the same time at least one signal is transmitted from the sending to the receiving component using the respective voltage level. The voltage level for representing the signal at the receiving component is compared with a reference variable or the signal is compared with a reference pattern and, when a sufficiently high voltage level has been reached to allow correct representation of the transmitted signal, a notification is transmitted to the sending component. Finally, the increase in the voltage level at the output of the sending component is stopped upon reception of the notification (claim 1). By means of the method according to the invention the minimum voltage level for the transmission of data is set in an efficient manner at the receiving component. By this means the power dissipation of the components or the system and interferences on adjacent channels due to high voltage levels are minimized. The accuracy of the integrated current or voltage sources can be lower and no external elements are required for setting the output current.

In a variant of the method according to the invention a bit pattern or a bit pattern sequence known to the receiving component is transmitted at least once from the sending to the receiving component using the respective voltage level. The transmitted bit pattern or the transmitted bit pattern sequence is compared at the receiving component with the known bit pattern or the known bit pattern sequence and in this way the correct transmission is checked. In the event of a correct transmission, a notification is sent to the sending component, as a result of which the increase in the voltage level is caused to stop (claim 2). With this variant, the setting is performed dynamically; that is to say, at the full data rate to be transmitted. By this means it is also possible to compensate for attenuations of the signal which are caused at very high data rates in the Gbit/s range by dielectric losses of the module material and the skin effect on the lines, i.e.

the setting takes account of the frequency dependence of the signal level. Line interference due to reflections and crosstalk is also taken into account here.

In one implementation of the method according to the invention, the voltage level of the transmitted signal is compared by means of a level comparator at the receiving component using a reference voltage level which corresponds to the required minimum input voltage. When the minimum input voltage is equaled or exceeded, a notification is sent to the sending component, thereby causing the increasing of the voltage level to be stopped (claim 3). The use of a level comparator provides a simple and efficient means of checking whether the signal level is sufficient for the error-free transmission of data. The information for stopping the increase in the voltage level can be transmitted via a separate line (claim 4). An additional line for transmitting the information can usually be provided without major additional overhead. A solution with an additional line is to transmit the information for stopping the increase in the voltage level via the signal line itself (claim 5).

It is advisable to perform the method during an adjustment phase, in particular during a restart of the system comprising the module or modules (claim 6). Using an adjustment phase for performing the method avoids additional interruptions during operation of the components or the system.

Alternatively, the information for stopping the increase in the voltage level can be transmitted via an existing line by means of a multiplexer included in the circuit accordingly during the adjustment phase at the receiving component and a demultiplexer included in the circuit accordingly at the sending component. In this case use is made of a line via which no signals not being used for the level setting are transmitted during the voltage level adjustment phase (claim 7). This alternative does away with the need for an additional line. The information can be transmitted here by means of an additional current or voltage source at the receiving component. In order to transmit the information by means of the additional current or voltage source, the potential level of the line used is changed such that it exceeds of falls below a threshold voltage. The overshooting or undershooting of the threshold voltage is detected at the sending component and the increasing of the voltage level is stopped (claim 8).

The voltage level can be increased by means of a counter operating according to a clock, whereby an output stage of the sending component is controlled in such a way by the counter that the voltage level is increased according to the clock (claim 9). The use of a clocked counter permits the voltage level to be increased incrementally. If the method is performed during an adjustment phase and a separate return line is used, the method can be performed in the following way: The counter is reset by means of an edge detector which resets the initialization signal used to initialize the adjustment phase. The counter is switched on by means of an activation signal at the initialization input, whereby this signal is generated by logical ANDing of the initialization signal indicating the adjustment phase with the potential value of the line for transmitting the information for stopping the increase in the voltage level in such a way that the counter is activated during the adjustment phase for as long as the desired voltage level has not yet been reached. The counter operates according to a clock signal. With an ascending count, the voltage level is increased gradually by activation of various stages of a current or voltage source. Finally, when the desired voltage level is reached, the potential value of the line for transmitting the information for stopping the increase in the voltage level is changed, with the result that the signal at the initialization input changes, thereby causing the counter to be stopped (claim 10).

As an alternative to a counter, the control block of the method according to the invention can be efficiently implemented by means of a shift register. In this case an output stage is controlled on the send side according to a clock via a shift register such that the voltage level is increased according to the clock (claim 11).

When the voltage level is set during an adjustment phase, whereby a separate return lines is used for transmitting the information, the shift register can be reset by means of an edge detector which detects the initialization signal used to initialize the adjustment phase. The shift register operates according to a clock, whereby:

- the clock signal is logically linked to the signal applied to the line for transmitting the information for stopping the increase in the voltage level and the initialization signal indicating the adjustment phase in such a way that the clock signal is activated during the adjustment phase for as long as the voltage level at the input of the receiving component is less than the desired value,
- the shift register activates one by one according to the clock the individual sources of a current source or voltage source formed from a number of individual sources such that the current value or voltage value of the current or voltage source and hence the voltage level is increased gradually, and
- when the desired voltage level is reached, a signal is applied to the line for transmitting the information for stopping the increase in the voltage level, thereby causing the shift register to be stopped (claim 12).

In addition, the power dissipation of the component can be minimized by de-energizing the circuit elements which are only active during the adjustment phase after the end of the adjustment phase (claim 13).

If the voltage level from the sending component to a plurality of receiving components is set, the voltage level can be set for transmission to the component that is furthest away and the voltage level determined in this way used for transmission to all the receiving components (claim 14). In this case, the furthest away receiving component will often be provided for setting the send level (claim 15) in which receiving component the greatest attenuation of the signals occurs owing to the length of the transmission link. An operating situation of this kind, where for example very many signals are distributed from a sending component to a plurality of receiving components, frequently occurs in switching systems in switching matrixes or in computers between processors and memory components. The additional overhead is particularly low in this case, because a single return line from the component which is furthest away from the transmitter.

In the circuit arrangement according to the invention, the sending component has a variable current or voltage source, by means of which different voltage levels of signals to be transmitted to the receiving component can be generated. The receiving component has a level comparator by means of which a reference voltage can be compared with the voltage level of a signal transmitted by the sending component. The level comparator has an output which is connected to a gate of the sending component. The gate is provided with a further input via which a logical signal can be applied, by means of which the information about the start and end of an adjustment phase can be fed in. The output of the gate is connected to a control block, by means of which the current or voltage source can be notched up (claim 16). If a differential signal is used, two can be provided for the transmission (claim 17).

In one embodiment of the circuit arrangement according to the invention, the current or voltage source is formed with a plurality of current or voltage generation elements and the control block with a counter, whereby the output of the gate is connected to the initialization input of the counter, an edge detector is provided at whose input the signal for initializing the adjustment phase can be applied and whose output is connected to the reset input of the counter, the counter has an input for a clock signal, the counter has outputs which are connected to different stages of the current source or voltage source in such a way that with ascending counting the current or voltage value supplied by the source can be increased incrementally (claim 18). Thus, a gradual increase in the voltage level can be implemented by means of a counter and a multistage current or voltage source.

In another embodiment using a shift register the current source or voltage source is formed by means of a number of individual sources and the control block by means of a shift register, whereby an additional gate is provided, one input of which is connected to the output of the other gate, via the other input of which a clock signal can be fed in, and the output of which is connected to the shift register, an edge detector is provided at whose input the signal for initializing the adjustment phase can be applied and whose output is connected to the reset input of the counter, the shift register has outputs which are connected to the current source or voltage source formed by a series of individual sources in such a way that the number of individual sources which contribute to the current or voltage values of the current or voltage source can be increased incrementally (claim 19).

BRIEF DESCRIPTION OF THE DRAWINGS

The subject matter of the application will be explained in more detail below in the context of exemplary embodiments with reference to figures, in which.

DETAILED DESCRIPTION OF INVENTION

Figure 1:
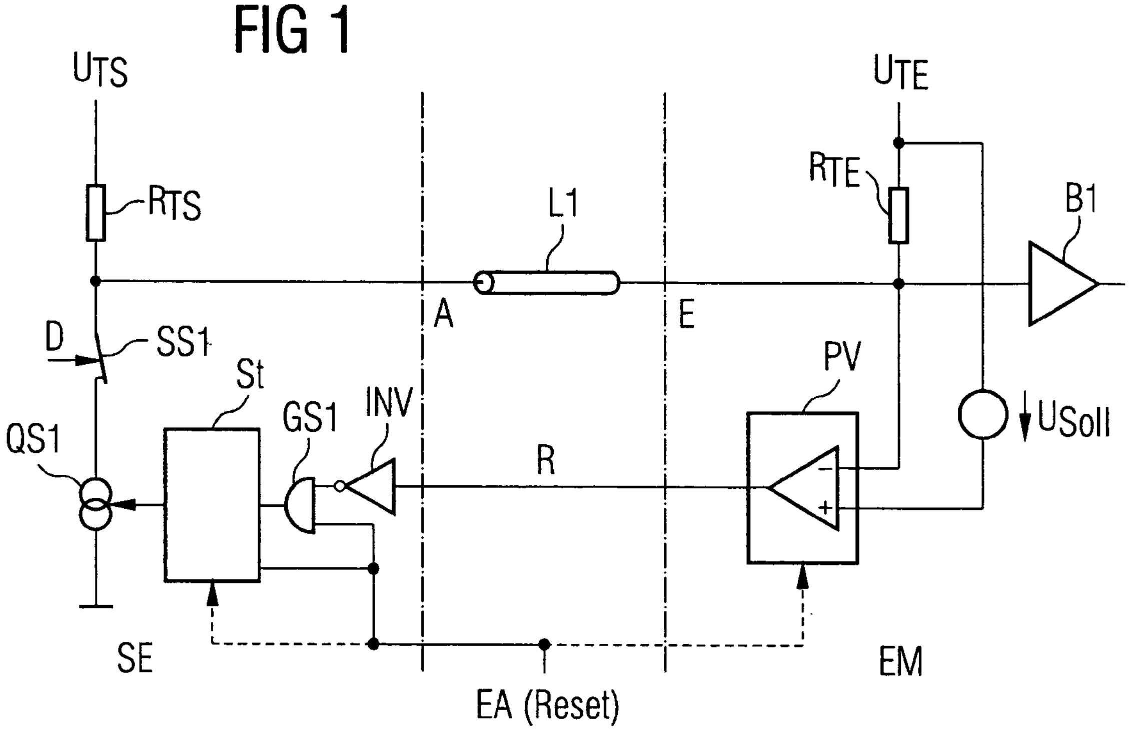
FIG. 1 is a schematic representation of an implementation of the subject matter of the invention for a single-clock signal using an additional line.
Figure 2:
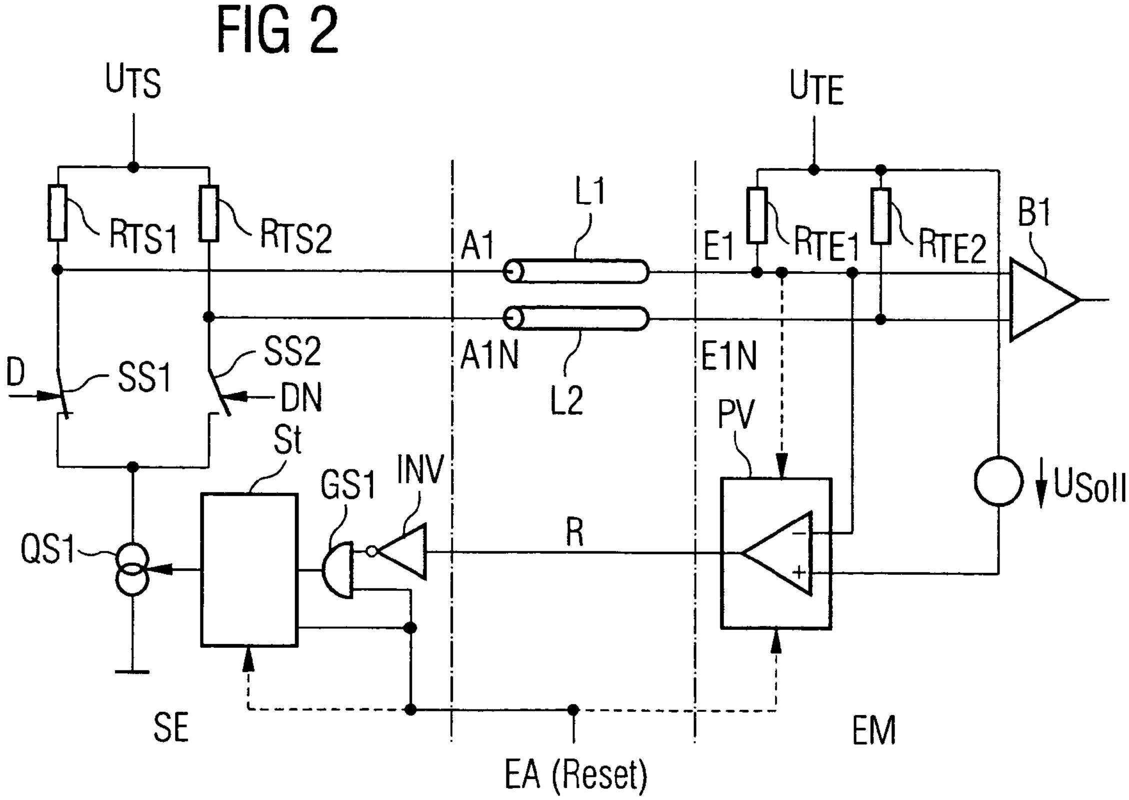
FIG. 2 is a schematic representation of an implementation of the subject matter of the invention for a differential signal using an additional line.

In the figures the same reference characters designate identical elements. FIGS. 1 and 2 are schematic representations of implementations of the subject matter of the invention using a separate return line R. A separate return line R leads from the receiving component—referred to in the following as the receiver—to the sending component—referred to in the following as the transmitter. This return line R usually represents no appreciable additional overhead.

FIG. 1 shows important elements for setting the voltage level by means of level comparison. At the input of the receiver there is a level comparator PV which compares the present voltage level with a reference voltage Usoll which is equal to the required minimum input voltage of the receiver. The association of the circuit elements of transmitter and receiver are made clear by means of dashed lines and the reference characters SE and EM. The logical value which is represented by the output signal of the level comparator PV is inverted if the reference voltage Usoll is exceeded. The switchover is reported back to the transmitter SE and causes the increasing of the output current to be stopped. The transmitter SE has a transmitter stage which comprises a current source QS1 which can be switched on and off by means of a switch SS1. The resistor $R_{TS}$ is a possibly present terminating resistor at the transmitter, which can be dispensed with at low data rates. L1 is a signal line which connects the output A of the transmitter SE to the input E of the receiver EM.

Figure 5:
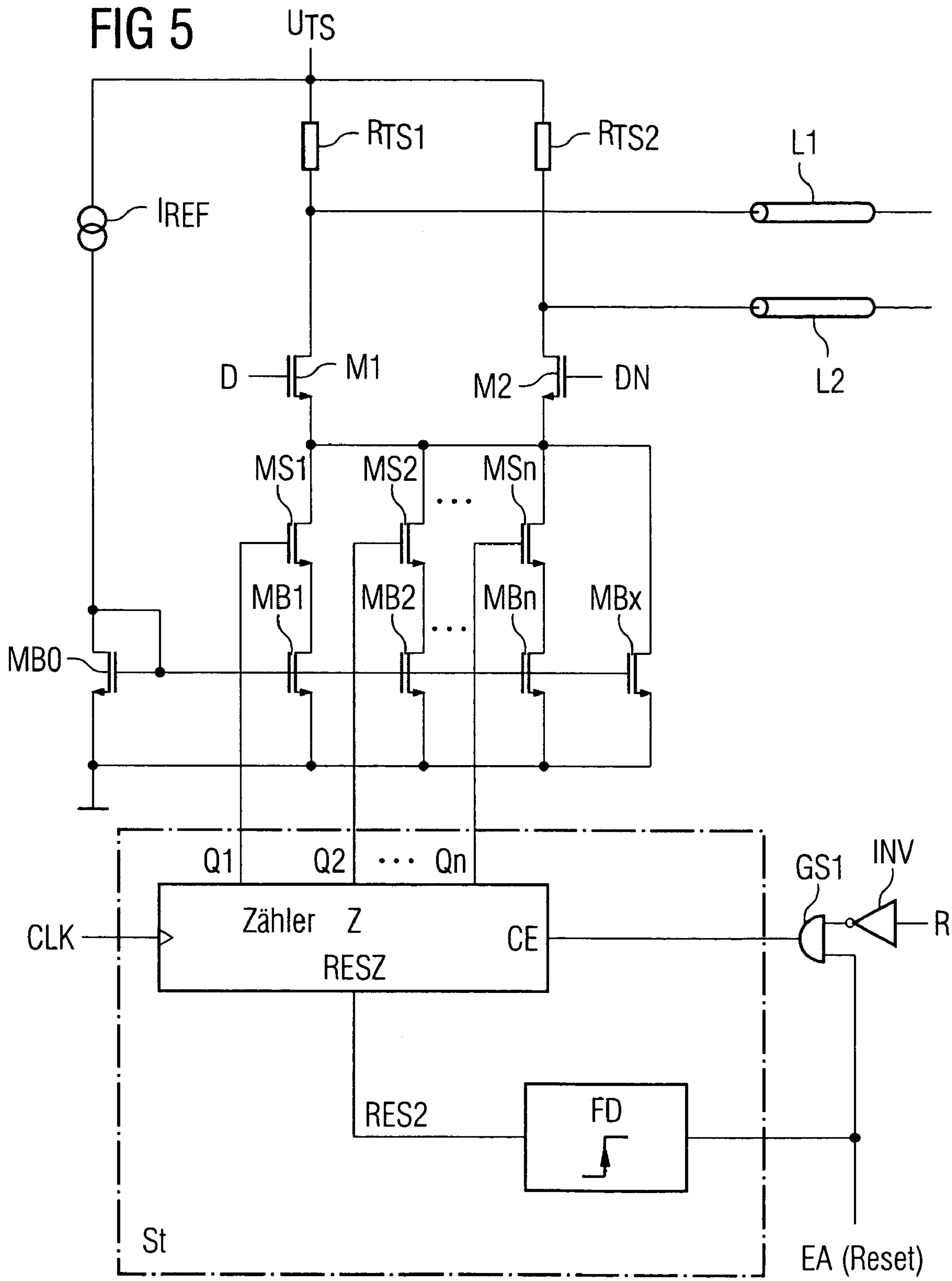
FIG. 5 shows an implementation of the controller for the inventive setting of the voltage level by means of a counter.
Figure 6:
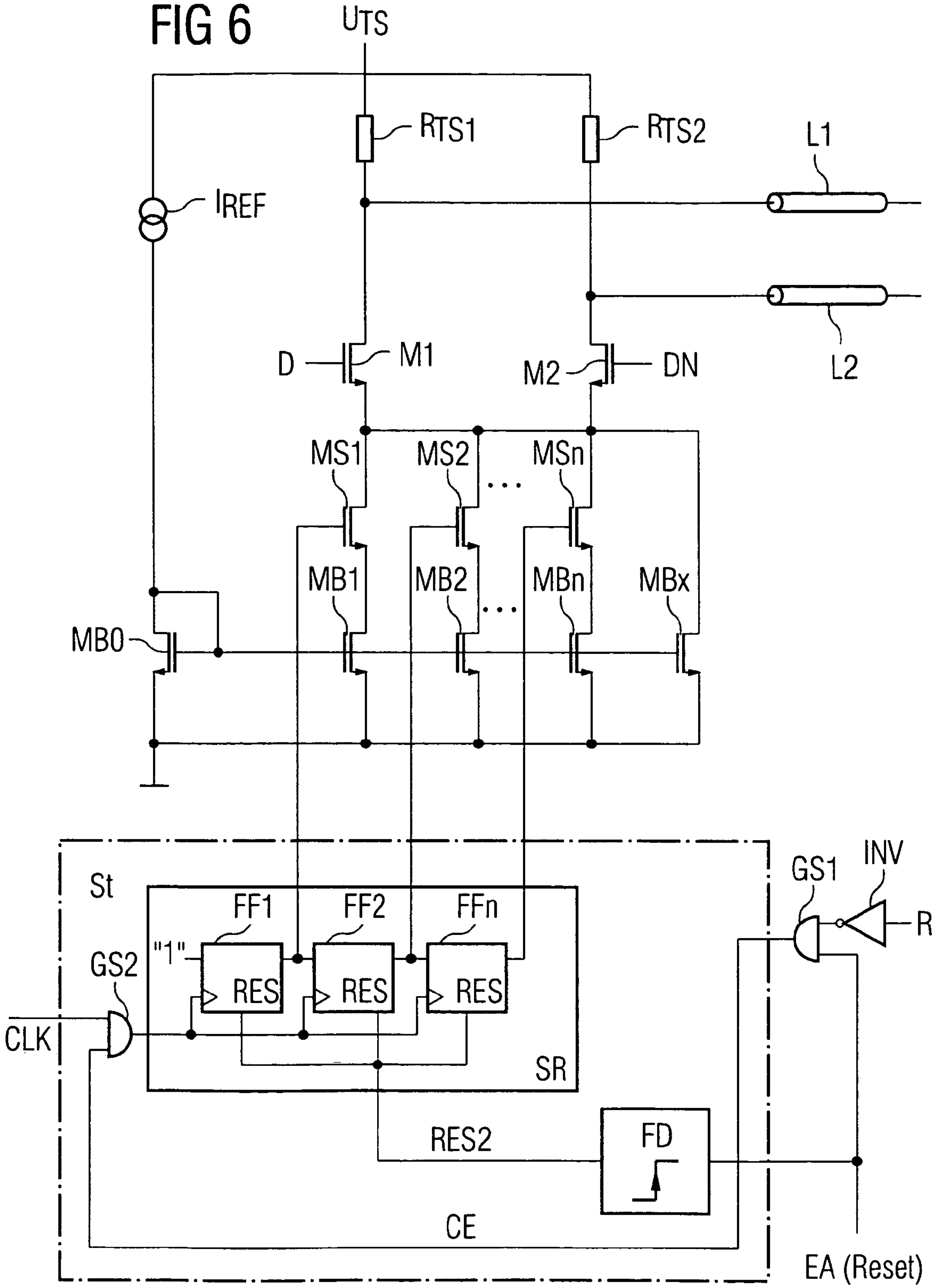
FIG. 6 shows an implementation of the controller for the inventive setting of the voltage level by means of a shift register.

The voltage level of transmitted signals must be set for this signal line L1. $R_{TE}$ is the terminating resistor of the receiver EM. The termination voltages for the resistors $R_{TS}$ and $R_{TE}$ are $U_{TS}$ at the transmitter SE and $U_{TE}$ at the receiver EM. In order to avoid a constant current flow between $U_{TS}$ and $U_{TE}$ and consequently an unnecessary consumption of power $U_{TS}$ and $U_{TE}$ should have the same values. B1 is the input buffer which detects the signal for further processing in the component. The setting of the voltage level is initiated by a signal EA (for: adjustment phase active) which is applied at the gate GS1 and represents a logic one. The signal EA can for example be the signal for the restart, which is often also referred to by the term “reset”. The output signal of the level comparator PV is applied at the inverter INV via the line R, said output signal representing a logic zero at the start of the adjustment phase. The gate GS1 is embodied as an AND gate. At the start of the adjustment phase a logic one indicating the adjustment phase is applied one input of the gate GS1. A logic one is also applied at the other input as long as the voltage level has not yet reached the value Usoll for the correct representation of transmitted signals. A t the same time a logic zero is applied at the return line by the receiver EM and is inverted by an inverter INV so that a logic one is applied at the control block ST. The current source QS1 is increased via this control block ST, for which implementations are indicated in FIGS. 5 and 6. The switch SS1 is closed at the start of the adjustment phase. At the receiver EM there is one input of a level comparator PV, which is indicated here as a comparator, at the signal line L1. The level comparator PV compares the voltage level on the input line L1 with a reference voltage Usoll. The reference voltage Usoll corresponds here to the voltage value which is necessary as a minimum for the detection of signals at the receiver EM, i.e. the voltage value to be set. The output of the level comparator PV supplies the feedback signal R. The feedback signal R represents the logic value zero as long as the voltage level is below the reference voltage Usoll and takes on the logic value one if the input potential E falls below the value $U_{TE}$–Usoll. The voltage level is then sufficiently large to represent the logic value zero. The reference voltage Usoll can be generated from the voltage UTE by voltage division. In many cases a local reference voltage is present, e.g. as p art of the bias generation for closed-circuit current compensation, which can be used for this.

The function of the control block ST is to increase the current of the current source QS1 and hence the voltage level when the adjustment phase is activated by the signal EA until the feedback message R comes from the receiver EM signaling that the desired voltage value has been reached. In response to the feedback message R the current increase is interrupted by the control block ST and the current supplied by the current source QS1 fixed at the value reached. In this way the voltage level is also fixed at the value reached and is used from this point for data transmission. In order to reduce the power dissipation, circuit components which are active only during the adjustment phase can be de-energized after the adjustment phase, as indicated by dashed lines in FIG. 1.

FIG. 2 is a schematic representation of an implementation of the subject matter of the invention for a differential signal using an additional line R. Here, the circuit elements shown correspond to those of a CML interface. The principle of the implementation shown in FIG. 2 is not restricted to CML interfaces, however, but can also be applied to other interface standards, e.g. LVDS interfaces. LVDS interfaces operate in part with current sources which can feed in current in both directions at the terminating resistors.

Owing to the differential mode of operation the send stage consists of a current source QS1 with two switches SS1 and SS2, which connect one output or the other to QS1 according to the polarity of the send information. Accordingly, two terminating resistors RTS1 and RTS2 are present at the transmitter SE, and two signal lines L1 and L2 and two terminating resistors RTE1 and RT E2 at the receiver EM. During the adjustment phase the transmitter SE sends a constant signal so that the potential of the output A1 corresponds to a logic zero and the potential of the output A1N corresponds to a logic one, which is also expressed by the switch settings of SS1 and SS2 in FIG. 2. By means of the level comparator PV the voltage level at the input E1, which is at logic zero, is compared with the reference value Usoll. The remaining elements or functions shown in FIG. 2 correspond to those from FIG. 1. In a more elaborate implementation the level comparator PV can also evaluate the differential voltage of the two signal lines L1 and L2 and compare it with the reference value, as indicated by a dashed line between the line L2 or the input EIN and the level comparator PV.

An existing line is used for the feedback message, e.g. a control line which transmits no relevant information during the adjustment phase. On this line there are disposed a multiplexer at the receiver EM and a demultiplexer—not shown in the figure—at the transmitter SE. The multiplexer and demultiplexer are switched over by means of the initialization signal (EA) at the start of the adjustment phase such that during the adjustment phase the receiver puts its feedback information onto this line and the transmitter evaluates this information at the corresponding demultiplexer output. As an alternative to using an existing line, the feedback information can also be transmitted via the signal line itself or a separate line.

Figure 3:
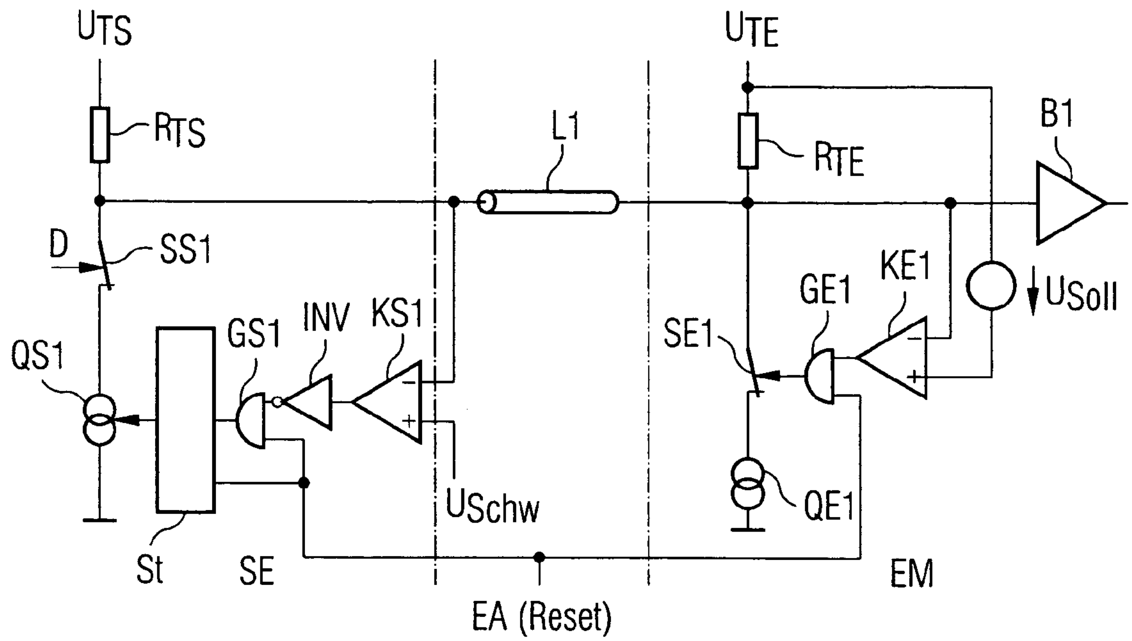
FIG. 3 is a schematic representation of an implementation of the subject matter of the invention for a single-clock signal without an additional line.
Figure 4:
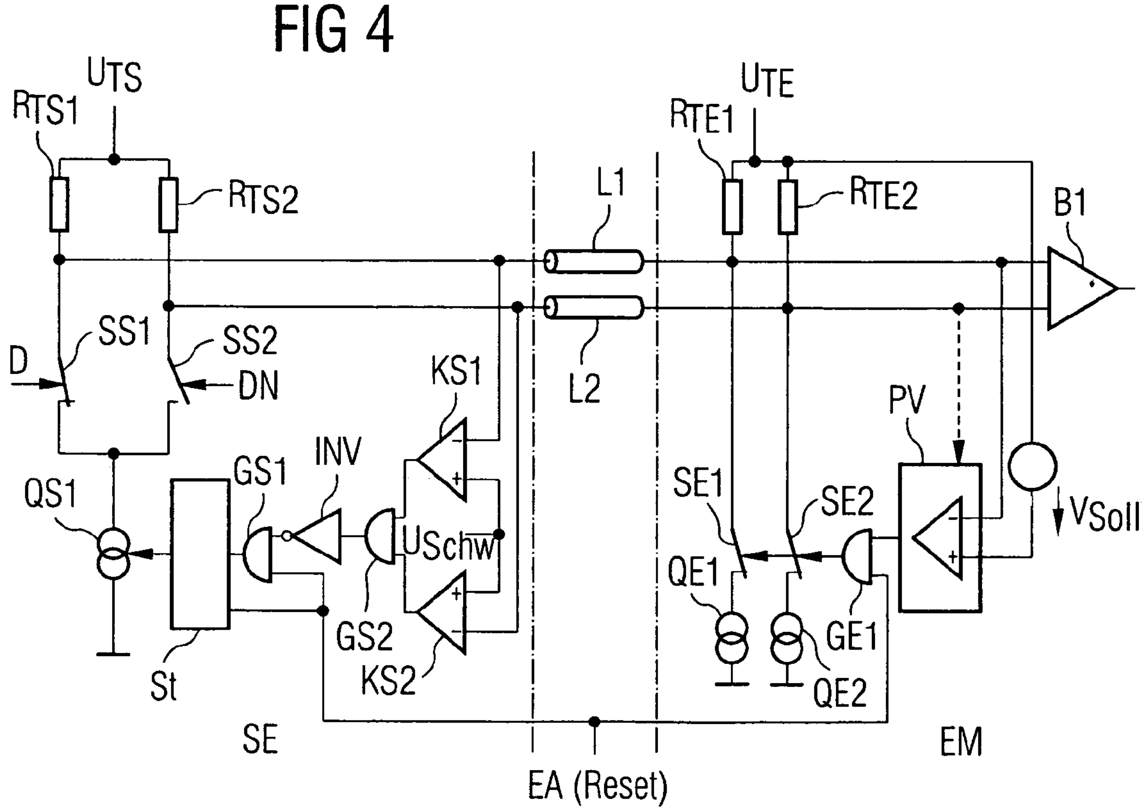
FIG. 4 is a schematic representation of an implementation of the subject matter of the invention for a differential signal without an additional line.

FIG. 3 shows a schematic representation of an implementation of the subject matter of the invention for a single-clock signal without additional line. The existing line L1 itself—referred to below as the signal line—is used for the feedback message. When a differential signal is transmitted, both lines L1 and L2 are used (FIG. 4). In the implementations presented in FIGS. 3 and 4, one or two current sources QE1 or QE1 and QE2 are present for this purpose at the receiver EM and, in the case of a feedback signal, supply an extra current in such a way that a potential level which is outside of the normal range is set at the terminating resistors on both the receive and send side, for example in the case of the CML interface represented in FIG. 3 the potential level is below a threshold value for the potential. This potential level is detected and the feedback message forwarded to the control block St of the transmitter SE. In FIG. 3, in contrast to FIG. 1, the switch SE1 and the current source QE1 are provided in addition at the receiver EM. As soon as the comparator KE1 activates its output, the extra current generated by the current source QE1 is supplied to the signal line L1. The transmitter SE is additionally provided with the comparator KS1, which compares the voltage level on the signal line L1 with a threshold voltage Uschw, whereby the threshold voltage Uschw lies below the voltage range provided for normal operation. With differential transmission, two additional current sources QE1 and QE2 with identical currents are provided at the receiver EM, said currents modifying the common-mode level of the signals in the event of a feedback signal. The control block St responds accordingly to a change in the common mode level during the adjustment phase (FIG. 4). QE1 and QE2 are the additional current sources which are switched by means of the switches SE1 and SE2. On the transmitter side there are two comparators KS1 and KS2. The AND gate GS2 links the comparator outputs so that the current in crease is stopped if the voltage levels on both signal lines L1 and L2 fall below the threshold value Uschw.

It should also be noted in relation to FIG. 3 that at the start of the adjustment process blocking could occur in the loop comprising the elements SE1, GE1 and KE1 if the switch SE1 were closed. In this case it must be ensured that SE1 is opened at the start of the adjustment process and remains open until the transmitter has set its output to the minimum value. During the adjustment process SE1 is then closed and must then be opened again after termination of the adjustment process, i.e. when EA goes to logic 0.

In order to set the voltage level for high-frequency data exchange, a known reference pattern can be transmitted instead of the comparison with a reference voltage and a check made to verify correct transmission at the receiver. With this variant of the subject matter of the invention, a fixed bit pattern known to the receiver is sent several times in succession during the adjustment phase. The receiver continuously analyzes the incoming data. If the voltage level for data transmission or the send level is still too low, bit errors will occur in the received data. If the bit pattern is detected as error-free, then the send level is adequate and the adjustment phase can be terminated as described above. In this case, admittedly, a certain additional overhead is necessary for generation of the bit patterns at the transmitter and for the analysis at the receiver. In many cases, however, such functions are already provided in the components. For example, frame alignment signals are used for synchronization purposes or pseudo random bit sequences for test purposes (PRBS).

The corresponding circuit components can advantageously be used as well. If the setting is performed during the reset phase of the components, these circuit components must not be reset during this time and it must be ensured that they run away correctly from any state.

FIG. 5 shows an implementation of the controller for the setting according to the invention of the voltage level using a counter Z. The switching transistors are designated M1 and M2 and correspond to the switches shown in FIGS. 1 and 2. In this implementation, metal oxide field effect transistors, usually abbreviated to MOSFET, are provided. Bipolar or gallium arsenide transistors can also be used. The data signal D or the inverse data signal DN to this is present at the input of the switching transistors M1 and M2. The current source consists of the transistors MB0, MB1, . . . , MBn. Each of the individual transistors for current generation MB1, . . . , MBn has in its drain terminal a series transistor MS 1, . . . , MSn, by means of which the respective current can be switched on or switched off. Independently of this, a further transistor MBx can also be present which supplies a base current or minimum current which cannot be switched off. There is provided a counter Z whose count outputs Q1, Q2 . . . Qn are connected to the gates of the individual switching transistors MS1, . . . , MSn. The present counter reading determines which of the switching transistors MS1, . . . MSn are blocked and which are conducting, and therefore the output current. The counter Z is supplied with a clock CLK (for: clock) which must be active during the adjustment phase—e.g. the reset phase—in other words, for example, the clock which is also used to clock in the reset signal which is applied asynchronously to most of the components. The adjustment phase is activated by the signal EA (for: adjustment phase active) which is present at an edge detector FD and the gate GS1. The edge detector FD responds to the positive edge of the signal EA and supplies a signal RES2 to the reset input RES2 of the counter Z, thereby resetting the counter Z to the initial status. At the input CE (for: count enable) of the counter Z, counting is activated by the signal EA via the gate GS1. The counter Z is an up-counter, i.e. the counter reading increases. The current sources are dimensioned such that the output current increases in line with the increasing counter reading. As soon as the feedback signal indicating that the voltage level at the receiver input is sufficiently high, the current increase is stopped. The increase in current is interrupted via the return line R through application of a signal at GS 1, with the result that the activation of the counting process is interrupted at the counter input CE and the counter reading remains stationary at the value reached.

The counter Z can be implemented as a 1-out-of-n counter. The dimensioning of the current source must then be such that each time the counter signal is passed on to the next stage a new current source is switched on which feeds in a higher current than the preceding one. This is usually achieved via the dimensioning of the transistor width. The count clock must be slow enough to enable the current sources to follow the changes. If the component clock is too fast, a slower clock can be derived from it by means of a frequency divider.

FIG. 6 shows an implementation of the controller for the setting according to the invention of the voltage level by means of a shift register which consists of the D flip-flops (data latch flip-flops) FF1 . . . FFn. The clock inputs of the flip-flops FF1 . . . FFn receive a slow clock CLK. A logic one is permanently applied at the D input of the first flip-flop FF1. At the start of the adjustment phase the flip-flops FF1 . . . FFn are reset by means of the positive edge of the signal EA via the edge detector FD, i.e. the potential values of the outputs Q1 . . . Qn represent logic zeros. The individual current sources are therefore switched off; only a base current supplied via the transistor MBx is then present. Thus, the voltage level at the receiver EM is too low at the start of the adjustment phase and the feedback signal line is accordingly set to a potential value which represents a logic zero. Since the signal EA represents a logic one during the adjustment phase, the clock CLK for the flip-flops is enabled via the gate GS2. The edge detector FD sets the reset inputs of the flip-flops back to zero and the logic one is shifted on by the shift register such that with each clock pulse a further flip-flop output goes to logic one and an additional current source becomes active and therefore the overall output current is increased.

In this case all the current sources are usefully dimensioned to be identical, so that the output current will then increase uniformly. If the return line R is activated, GS2 blocks the clock CLK of the shift register and the present status is fixed.

Figure 7:
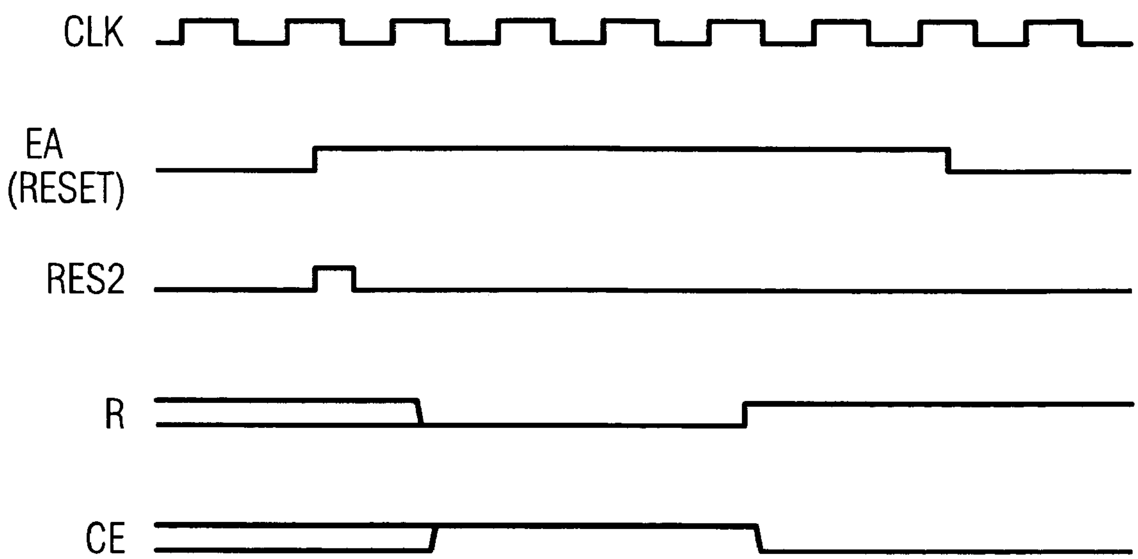
FIG. 7 shows a timing diagram for the signal states of relevant control parameters during the adjustment phase.

FIG. 7 shows a timing diagram for the signal states of relevant control parameters during the adjustment phase for implementations of the controller according to the invention corresponding to FIG. 5 or 6. Here, CLK designates the clock frequency. The signal EA activates the adjustment phase. This can be, for example, the reset signal. By means of an edge detector FD the signal EA generates the signal RES2, with which the counter or the shift register is set to its initial setting. The too low voltage level is detected with a certain delay at the receiver and the feedback signal R is set to zero. Setting the signal R causes the counter or the shift register to be activated via the signal CE. The feedback signal R and the signal CE for activating the control block St can be in the logic states zero or one before they are set, which is indicated by two lines in FIG. 7. When the desired voltage level is reached, the feedback signal R is set to 1, as a result of which the counter or shift register is deactivated by the signal CE.

The invention claimed is:

1. A method for setting the voltage level for the electrical transmission of data between a sending component and a receiving component, comprising:

increasing the voltage level at an output of the sending component;

transmitting at least one signal from the sending component to the receiving component using the voltage level;

representing the voltage level for the signal at the receiving component;

comparing the signal with a reference quantity or a reference pattern;

transmitting a notification to the sending component when a sufficiently high voltage level for correctly representing the transmitted signal is reached; and stopping the increase in the voltage level at the output of the sending component upon reception of the notification.

2. The method according to claim 1, further comprising:

transmitting a bit pattern or a bit pattern sequence known to the receiving component from the sending component to the receiving component using the voltage level, and comparing the transmitted bit pattern or the transmitted bit pattern sequence at the receiving component with the known bit pattern or the known bit pattern sequence in order to check the correctness of the transmission, and if the transmission is correct, then sending a notification to the sending component in order to stop the increase in the voltage level.

3. The method according to claim 1, wherein the voltage level of the transmitted signal is compared by a level comparator at the receiving component with a reference voltage level which corresponds to the required minimum input voltage, and if the voltage level is equal to or exceeds the minimum input voltage, then sending a notification to the sending component in order to stop the increase in the voltage level.

4. The method according to claim 1, wherein the notification for stopping the increase in the voltage level is transmitted via a separate line.

5. The method according to claim 1, wherein the notification for stopping the increase in the voltage level is transmitted via the signal line.

6. The method according to claim 1, wherein the method is performed during an adjustment phase.

7. The method according to claim 6, wherein the notification for stopping the increase in the voltage level is transmitted by a multiplexer during the adjustment phase at the receiving component and a corresponding demultiplexer at the sending component via an existing line.

8. The method according to claim 7, wherein a potential level of the line used for the notification is modified such that it exceeds or falls below a threshold voltage, and the exceeding or falling below threshold voltage is detected at the sending component.

9. The method according to claim 6, wherein the voltage level is increased by a counter operating according to a clock, whereby an output stage of the sending component is activated by the counter such that the voltage level is increased according to the clock.

10. The method according to claim 6, wherein the counter is reset by an edge detector which detects an initialization signal for initializing the adjustment phase, the counter switched on by an activation signal at the initialization input, whereby the activation signal is generated by logical ANDing of the initialization signal indicating the adjustment phase and the potential value of the line for transmitting the notification for stopping the increase in the voltage level such that the counter is activated during the adjustment phase as long as the desired voltage level has not yet been reached, the voltage level increased by activation of different stages of a current or voltage source so that when the desired voltage level is reached the potential value of the line for transmitting the notification to stop the increase in the voltage level is modified such that the signal at the initialization input changes in order to stop the counter.

11. The method according to claim 10, wherein a shift register activates an output stage according to the clock such that the voltage level is increased according to the clock.

12. The method according to claim 11, wherein the shift register is reset by an edge detector which detects the initialization signal, the shift register operating according to a clock signal logically linked to the signal present at the line for transmitting the notification to stop the increase in the voltage level and the initialization signal indicating the adjustment phase such that the clock signal is activated during the adjustment phase as long as the voltage level at the input of the receiving component is below the desired value, wherein the shift register activates the individual sources of a current source or voltage source formed by a series of individual sources in succession according to the clock such that the voltage level is increased incrementally until the desired voltage level is reached, and then a signal is applied to the line for transmitting the notification to stop the increase in the voltage level in order to stop the shift register.

13. The method according to claim 6, wherein a plurality of circuit components that are active only during the adjustment phase are de-energized after the adjustment phase.

14. The method according to claim 1, wherein the voltage level from the sending component to one receiving component is used as the voltage level from the sending component to all the receiving components.

15. The method according to claim 14, wherein the voltage level is set for transmission to the most physically distant component.

16. A circuit arrangement for setting the voltage level for the electrical transmission of data, comprising:

a receiving component;

a sending component having a variable current source or a variable voltage source adapted to allow different voltage levels of signals to be transmitted to the receiving component;

a level comparator having an output connected to a gate of the sending component and operatively associated with the receiving component, the level comparator adapted to compare a reference voltage with a voltage level of a signal transmitted by the sending component;

a further input to the gate in which a signal concerning a start and end of an adjustment phase is provided; and a control block connected to the output of the gate adapted to increase the current or voltage source.

17. The circuit arrangement according to claim 16, wherein two lines are provided for the transmission of a differential signal.

18. The circuit arrangement according to claim 16, wherein the current or voltage source is formed by a plurality of current or voltage generation elements, the control block is formed by a counter, the output of the gate is connected to the initialization input of the counter, an edge detector having an input to apply the signal for initializing the adjustment phase and having an output connected to a reset input of a counter, the counter having an input for a clock signal and a plurality of outputs connected to different stages of the current source or voltage source such that as the counter increases the current or voltage value supplied by the source can be increased.

19. The circuit arrangement according to claim 16, wherein the current or voltage source is formed by a series of individual sources, the control block is formed by a shift register, an additional gate having an input into which a clock signal is fed and an output connected to the shift register, an edge detector having an input to apply the signal for initializing the adjustment phase and having an output connected to a reset input of the shift register, and the shift register having outputs which are connected to the current source or voltage source such that the number of individual sources which contribute to the current value or voltage value of the current or voltage source can be increased incrementally.

* * * * *